(12) United States Patent
Miyaki

(10) Patent No.: US 7,214,445 B2
(45) Date of Patent: May 8, 2007

(54) BATTERY

(75) Inventor: Yukio Miyaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 116 days.

(21) Appl. No.: 10/480,737

(22) PCT Filed: Apr. 10, 2003

(86) PCT No.: PCT/JP03/04537

§ 371 (c)(1),
(2), (4) Date: Dec. 12, 2003

(87) PCT Pub. No.: WO03/090296

PCT Pub. Date: Oct. 30, 2003

(65) Prior Publication Data

US 2004/0151980 A1 Aug. 5, 2004

(30) Foreign Application Priority Data

Apr. 19, 2002 (JP) ............................. 2002-118379

(51) Int. Cl.
*H01M 4/38* (2006.01)
*H01M 4/52* (2006.01)

(52) U.S. Cl. ............... 429/218.1; 429/217; 429/231.1; 429/231.8; 429/324

(58) Field of Classification Search .................... None
See application file for complete search history.

(56) References Cited

U.S. PATENT DOCUMENTS 3,228,866 A * 1/1966 Pryor .................... 204/196.23

6,797,434 B1 * 9/2004 Matsubara et al. ..... 429/231.95
2004/0072070 A1 * 4/2004 Miyamoto et al. .......... 429/223

FOREIGN PATENT DOCUMENTS

| JP | 02-199773 | * | 8/1990 |
| JP | 10-162823 | | 6/1998 |
| JP | 11-16567 | | 1/1999 |
| JP | 11-73969 | | 3/1999 |
| JP | 11-073969 | * | 3/1999 |
| JP | 10-308207 | | 11/1999 |
| JP | 2001-325987 | | 11/2001 |

* cited by examiner

*Primary Examiner*—John S. Maples
(74) *Attorney, Agent, or Firm*—Sonnenschein Nath & Rosenthal LLP

(57) ABSTRACT

Provided is a battery capable of obtaining a superior battery capacity and a superior charge-discharge cycle characteristic under high temperature conditions, and improving a load characteristic. A laminate including a cathode (21) and an anode (22) with a separator (23) in between is spirally wound. The cathode (21) includes a cathode mixture layer which includes a lithium-containing complex oxide including at least one kind selected from the group consisting of Co, Ni, Mn and Fe. The anode (22) includes an anode mixture layer including a tin-containing alloy, a carbon material, and a fatty acid or a metal salt thereof. Thereby, a superior battery capacity and a superior charge-discharge cycle characteristic under high temperature conditions can be obtained. Moreover, when the content of the fatty acid or the metal salt thereof in the anode mixture layer is within a range from 0.1 wt % to 6 wt % inclusive, a load characteristic can be improved.

5 Claims, 1 Drawing Sheet

BATTERY

BACKGROUND OF THE INVENTION

The present invention relates to a battery comprising a cathode, an anode and an electrolyte in which the anode includes an anode mixture layer including a tin-containing alloy powder.

A large number of small-sized portable electronic devices such as camera/VTR (video tape recorder) combination systems, cellular phones, laptop computers or the like have come into widespread in accordance with recent advances in electronics, and a development for reducing their sizes and weights has proceeded. Accordingly, a development in compact and lightweight batteries having a high energy density, specifically secondary batteries as portable power sources used in the portable electronic devices has proceeded. As such secondary batteries, for example, batteries which use a graphite material using intercalation reaction of lithium ions into graphite layers, or a carbon material using an application of insertion/extraction reaction of lithium ions into/from pores as an anode material have been developed and have been in practical use.

However, in accordance with a recent increase in performance of portable devices, a demand for capacity has been growing, so the batteries are required to have a characteristic in which no decline in capacity occurs in spite of repeated cycles of charge and discharge, that is, an excellent charge-discharge cycle characteristic. Moreover, in accordance with diversification of use conditions of the devices, a demand for batteries exhibiting an excellent capacity at high load has been growing. As a method of obtaining such characteristics, for example, it can be considered that light metal such as lithium metal or the like is used as-is as an anode material. However, in this case, in a charging process, the light metal in dendrite form is likely to be deposited on an anode, and a current density becomes extremely high at a tip of a dendrite, so the charge-discharge cycle characteristic may decline due to the decomposition of an electrolyte or the like, or when the dendrite excessively grows to reach a cathode, an internal short circuit may be induced.

In order to inhibit the deposition of lithium in dendrite form, it is considered that a specific alloy is used as an anode active material, and during charge, lithium deposited on a surface of the anode is alloyed with a base metal of an alloy of the anode active material to be introduced into the alloy. As such an alloy, a lithium-lead (Pb) alloy (for example, refer to Japanese Examined Patent Application Publication No. Hei 3-53743, Hei 5-34787, Hei 7-73044 and Hei 8-138654) or a bismuth (Bi)-tin (Sn)-lead-cadmium (Cd) alloy (for example, refer to Japanese Examined Patent Application Publication No. Hei 4-47431 and Hei 3-64987) have been disclosed. However, lead, bismuth and cadmium are not preferable in the viewpoint of recent environmental protection.

Moreover, although a method using a silicon (Si) alloy which causes very little damage to the environment has been proposed (refer to Japanese Unexamined Patent Application Publication No. Hei 7-302588, Hei 10-199524, Hei 7-326342, Hei 10-255768 and Hei 10-302770), the reaction between the silicon alloy and an organic solvent is so large that the charge-discharge cycle characteristic is poor, so it could not be put to practical use.

Further, a method using tin or a tin-containing alloy has been proposed. As the tin-containing alloy, for example, alloy materials of tin and nickel (Ni) (refer to Japanese Examined Patent Application Publication No. Hei 4-12586, Japanese Unexamined Patent Application Publication No. Hei 10-162823 and Sho 10-308207), alloy materials of lithium, aluminum (Al) and tin (refer to Japanese Unexamined Patent Application Publication No. Sho 61-66369), alloy materials of tin and zinc (Zn) (refer to Japanese Unexamined Patent Application Publication No. Sho 62-145650), materials of a tin alloy containing 1 wt % to 55 wt % of phosphorus (P) (refer to Japanese Unexamined Patent Application Publication No. Hei 8-273602), $Cu_2NiSn$ and $Mg_2Sn$ (refer to Japanese Unexamined Patent Application Publication No. Hei 10-223221), alloy materials of tin and copper (Cu) (refer to Japanese Unexamined Patent Application Publication No. Sho 10-308207), materials of a mixture of a tin-containing phase which absorbs lithium, and a phase made of manganese (Mn), iron (Fe), cobalt (Co), nickel and copper which does not absorb lithium (refer to Japanese Unexamined Patent Application Publication No. Hei 11-86854) have been disclosed.

However, in the case of a battery using tin or a tin-containing alloy, such a problem that the battery cannot fully satisfy requirements for the capacity, the charge-discharge cycle characteristic and a load characteristic arises.

Moreover, in accordance with diversification of use conditions of the devices, a demand for batteries exhibiting an excellent charge-discharge cycle characteristic under high temperature conditions has been growing. However, such a problem that the conventional batteries cannot obtain sufficient characteristics also arises.

In view of the foregoing, it is an object of the invention to provide a battery capable of obtaining a superior battery capacity and a superior charge-discharge cycle characteristic under high temperature conditions, and improving the load characteristic.

SUMMARY OF THE INVENTION

A battery according to the invention comprises: a cathode; an anode; and an electrolyte, wherein the anode includes an anode mixture layer including a tin-containing alloy powder, and the anode mixture layer includes at least one kind selected from the group consisting of fatty acids and metal salts thereof.

In the battery according to the invention, a tin-containing alloy powder is used in the anode, so a higher battery capacity can be obtained. Moreover, by the group consisting of the fatty acids and the metal salts thereof included in the anode mixture layer, a superior charge-discharge cycle characteristic can be obtained even under high temperature conditions.

DETAILED DESCRIPTION OF THE PRESENTLY PREFERRED EMBODIMENTS

Figure 1:
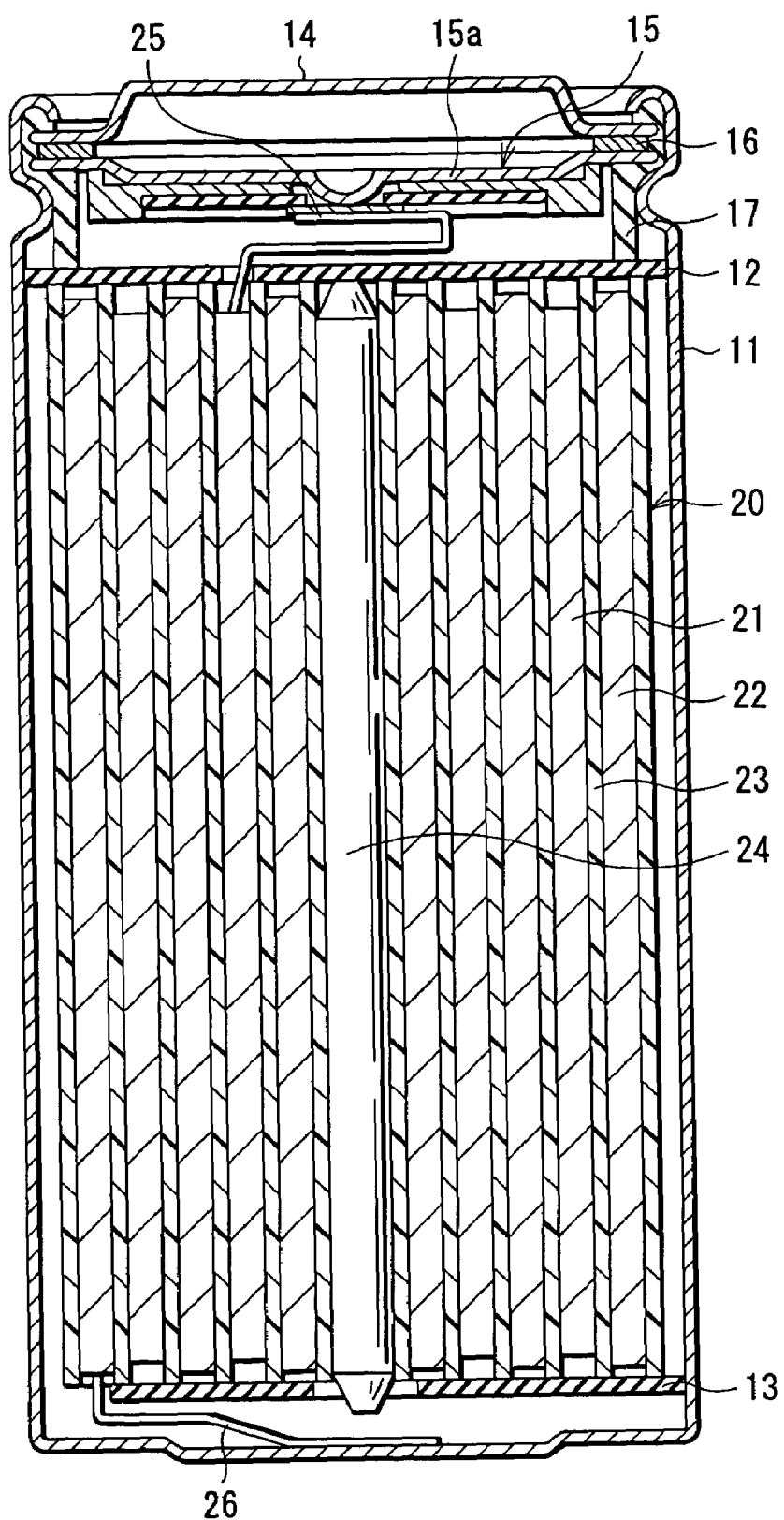
FIG. 1 is a sectional view of a secondary battery according to an embodiment of the invention.

A preferred embodiment of the present invention will be described in more detail below referring to the accompanying drawing.

FIG. 1 shows a sectional view of a secondary battery according to an embodiment of the invention, but the invention is not limited to the embodiment. The secondary battery is a so-called cylindrical battery, and comprises a spirally wound electrode body 20 including a strip-shaped cathode 21 and a strip-shaped anode 22 spirally wound with a separator 23 in between in a hollow cylindrical-shaped battery can 11. The battery can 11 is made of, for example, nickel-plated iron. An end portion of the battery can 11 is closed, and the other end portion thereof is opened. In the battery can 11, a pair of insulating plates 12 and 13 are disposed so that the spirally wound electrode body 20 is sandwiched therebetween in a direction perpendicular to a spirally wound peripheral surface.

In the opened end portion of the battery can 11, a battery cover 14 and, a safety valve mechanism 15 and a positive temperature coefficient device (PTC device) 16 disposed inside the battery cover 14 are mounted through caulking by a gasket 17, and the interior of the battery can 11 is sealed. The battery cover 14 is made of, for example, the same material as that of the battery can 11. The safety valve mechanism 15 is electrically connected to the battery cover 14 through the PTC device 16, and when internal pressure in the battery increases to a certain extent or higher due to an internal short circuit or external application of heat, a disk plate 15a becomes deformed so as to disconnect the electrical connection between the battery cover 14 and the spirally wound electrode body 20. When a temperature rises, the PTC device 16 limits current flow by an increased resistance, thereby resulting in preventing abnormal heat generation by a large current. The gasket 17 is made of, for example, an insulating material, and its surface is coated with asphalt.

The spirally wound electrode body 20 is wound around, for example, a center pin 24. A cathode lead 25 made of aluminum or the like is connected to the cathode 21 of the spirally wound electrode body 20, and an anode lead 26 made of nickel or the like is connected to the anode 22. The cathode lead 25 is welded to the safety valve mechanism 15 so as to be electrically connected to the battery cover 14, and the anode lead 26 is welded and electrically connected to the battery can 11.

The cathode 21 includes, for example, a cathode mixture layer and a cathode current collector layer, and has a structure in which the cathode mixture layer is disposed on either side or both sides of the cathode current collector layer. The cathode current collector layer is made of, for example, metal foil such as aluminum foil or the like. The cathode mixture layer includes a cathode material capable of inserting and extracting lithium as a cathode active material and, if necessary, an electronic conductor such as graphite or the like, a binder such as polyvinylidene fluoride or the like, and a conventionally known additive.

As the cathode material capable of inserting and extracting lithium, a lithium-containing composite oxide including a first element of at least one kind selected from the group consisting of cobalt, nickel, manganese and iron is preferable. The lithium-containing composite oxide may further include a second element of at least one kind selected from the group consisting of elements of alkali metal (in Group 1 (IA) of the periodic table) except for lithium, aluminum, gallium (Ga), indium (In), germanium (Ge), tin, lead, antimony (Sb), bismuth, silicon, phosphorus and boron (B). The content of the second element is preferably within a range from 0 mol % to 30 mol % inclusive at a mole ratio to the first element. As preferable lithium-containing composite oxides, $LiCoO_2$, $LiNiO_2$, $LiNi_xCo_{1-x}O_2$ (0.2<x<1), $LiNi_xCo_yMn_{1-x-y}O_2$ (0.1<x, y<1), $LiMn_2O_4$, $LiFePO_4$, $LiMn_xFe_{1-x}PO_4$ (0<x<0.65), $LiCoPO_4$ and so on are cited. As the cathode active material, one kind or a mixture of two or more kinds selected from the lithium-containing composite oxides may be used.

The anode 22 has, for example, a structure in which an anode mixture layer is disposed on either side or both sides of an anode current collector layer as in the case of the cathode 21. The anode current collector layer is made of, for example, metal foil such as copper foil, nickel foil, stainless foil or the like. The anode mixture layer includes an anode material capable of inserting and extracting lithium as an anode active material and, if necessary, an electronic conductor or a binder.

More specifically, in the secondary battery, as the anode material capable of inserting and extracting lithium, a tin-containing alloy power is included. The tin-containing alloy powder is made of tin and a third element. The content of the third element in the tin-containing alloy powder is preferably within a range from 10 wt % to 70 wt % inclusive, because a high capacity can be obtained within the range. As the third element, at least one kind selected from the group consisting of chromium (Cr), manganese, iron, cobalt, nickel, copper, zinc and molybdenum (Mo) is preferably included, and more preferably, at least one kind selected from the group consisting of cobalt, iron, copper and nickel is included.

The average particle size of primary particles of the tin-containing alloy powder is preferably within a range from 0.1 μm to 35 μm inclusive, and more preferably, within a range from 0.1 μm to 25 μm inclusive. Further, in the tin-containing alloy powder, secondary particles may be formed by agglomerating the primary particles. In this case, the average particle size of the primary particles is preferably within a range from 0.1 μm to 20 μm inclusive, and the average particle size of the secondary particles is preferably within from 10 μm to 40 μm inclusive. When the particle size is smaller than the range, an undesired reaction between surfaces of the particles and an electrolyte which will be described later becomes more pronounced, thereby the capacity and charge-discharge efficiency will decline. On the other hand, when the particle size is larger than the range, a lithium ion insertion/extraction reaction is difficult to proceed in the alloy particles, thereby the capacity will decline. In order to obtain a desired particle size, it is preferable that in a manufacturing process, the tin-containing alloy powder is classified before preparing an anode mixture which will be described later. As a method of classifying the powder, for example, dry classification such as screening, air classifier or the like and wet classification such as centrifugal setting machine or the like are cited, and it is preferable to choose from the methods depending upon an amount of particles to be processed or a particle size. Further, as a method of measuring the particle size, observation by an optical microscope or an electron microscope, laser diffraction, or the like is cited, and it is preferable to choose from the methods depending upon a range of particle size.

The crystallinity of the tin-containing alloy powder may be crystalline or amorphous. Specifically, an amorphous or microcrystalline aggregate is preferable. In the amorphous or microcrystalline aggregate, a half-width of the peak of a diffraction pattern obtained by X-ray diffraction using a CuKα ray is 0.5° or over at 2θ, and a pattern is as broad as from 30° to 60° at 2θ.

Moreover, for the purpose of inhibiting a side reaction with an electrolyte solution, improving stability of handling the tin-containing alloy powder, or the like, the surface of the tin-containing alloy power may be coated with another compound such as, for example, an oxide, an organic substance or an inorganic substance.

As a method of manufacturing the tin-containing alloy powder, a conventional method used for powder metallurgy or the like can be widely used. For example, there are a method in which a raw material is melted and cooled by a melting furnace such as an arc melting furnace, a high-frequency induction furnace or the like, and then is pulverized, a method of obtaining an alloy powder through rapidly quenching melted metal such as a single-roll quenching method, a two-roll quenching method, a gas atomization method, a water atomization method, a centrifugal atomization method or the like, and a method of obtaining an alloy powder through consolidating melted metal by a cooling method such as the single-roll quenching method, the two-roll quenching method or the like, and then pulverizing the metal by a suitable method such as a mechanical alloying method or the like. Specifically, the gas atomization method and the mechanical alloying method are preferably but not exclusively used. Further, in order to prevent oxidation by oxygen in air, these synthesis and pulverization are preferably carried out in an atmosphere of an inert gas such as argon (Ar), nitrogen (N), helium (He) or the like or in a vacuum.

As the electronic conductor of the anode mixture layer, a carbon material is preferable, because the electrical conductivity of the anode 22 as well as the impregnation of the electrolyte solution which will be described later can be improved. Among carbon materials, a material capable of inserting and extracting lithium, that is, the material which also functions as the anode active material is preferable, because when the anode comprise only the tin-containing alloy, a voltage relative to lithium metal is higher and a battery voltage becomes lower, but, in the carbon material, a voltage relative to lithium metal is lower, so the battery voltage becomes higher by mixing the carbon material.

As such a carbon material, for example, natural graphite (scaly graphite, flake graphite, amorphous graphite or the like), artificial graphite, non-graphitizable carbon, kinds of coke, kinds of graphite, kinds of glass-like carbon, a sintered high molecular weight organic compound body, a carbon fiber, activated carbon and kinds of carbon black (fine-grain carbon such as acetylene black, ketjen black or the like) are cited. Among them, kinds of coke include pitch coke, needle coke, petroleum coke and so on, and the sintered high molecular weight organic compound body is a high molecular weight material such as a phenolic resin, a furan resin or the like which is carbonized through sintering at an adequate temperature. The content of the carbon material in the anode mixture layer is preferably within a range from 5 wt % to 85 wt % inclusive, and more preferably within a range from 8 wt % to 70 wt % inclusive. When the content is less than the range, the penetration of the electrolyte solution into the anode declines, thereby resulting in a decline in the capacity, and when the content is more than the range, a ratio of the tin-containing alloy powder becomes too low, thereby resulting in a decline in the capacity.

The anode mixture layer may include an electrically conductive polymer such as, for example, polyacetylene, polypyrrole or the like as the electronic conductor.

The binder in the anode mixture layer is made of, for example, one kind or a mixture of two or more kinds selected from high molecular weight compounds such as polyvinylidene fluoride, polyethylene, fluoro rubber, ethylene-propylene-diene terpolymer (EPDM), polyvinylpyrrolidone, styrene butadiene rubber, polybutadiene or the like, and the binder is preferably but not exclusively made of one kind or a mixture of two or more kinds selected from styrene butadiene rubber, polyvinylidene fluoride and polyethylene. The content of the binder in the anode mixture layer is preferably within a range from 1 wt % to 30 wt %, and more preferably within a range from 2 wt % to 15 wt %.

Moreover, the anode mixture layer includes at least one kind selected from the group consisting of fatty acids and metal salts thereof as an additive. At least one kind selected from the group consisting of the fatty acids and the metal salts thereof is included in order to improve a charge-discharge cycle characteristic under high temperature conditions. Although specific functions of the fatty acids and the metal salts are not clear, it is considered that by coating the surface of the tin-containing alloy powder with the fatty acids and the metal salts, a degradation reaction during a charge-discharge cycle under high temperature conditions is prevented.

As the fatty acids, lauric acid, tridecylic acid, pentadecanoic acid, myristic acid, palmitic acid, stearic acid, isostearic acid, nonadecanoic acid, arachidic acid, behenic acid, oleic acid, linoleic acid and linolenic acid are cited. Among them, stearic acid, isostearic acid or oleic acid is preferable. Further, as the metal salt, an alkali metal salt or an alkaline earth salt is preferable, and the alkali metal salt is more preferable, and lithium salt is most preferable.

Moreover, as the fatty acid, a saturated fatty acid or an unsaturated fatty acid with a carbon number ranging from 10 to 25 inclusive is preferable, and as the metal salt thereof, an alkali metal salt or an alkaline earth salt of the saturated fatty acid or the unsaturated fatty acid with a carbon number ranging from 10 to 25 inclusive is preferable. When the carbon number is less than 10, the fatty acid and the metal salt thereof is eluted into the electrolyte, and when the carbon number is more than 25, the permeability of the electrolyte solution into the anode mixture layer declines.

The content of the fatty acid in the anode mixture layer is preferably within a range from 0.1 wt % to 6 wt % inclusive, and more preferably within a range of 0.1 wt % to 3 wt % inclusive. When the content is too small, the above-described effect cannot be sufficiently obtained, and when the content is too large, the battery capacity and the load characteristic decline, and a liquid is repelled when applying anode mixture slurry which will be described later to the anode current collector layer.

As a method of adding the fatty acid to the anode mixture layer, there are a method of adding the fatty acid during synthesizing the tin-containing alloy or during pulverizing the tin-containing alloy, a method of adding the fatty acid together with the tin-containing alloy and the carbon material during producing the anode mixture slurry which will be described later, a method of applying the fatty acid to the anode mixture slurry after applying the slurry to the anode current collector layer which will be described later, and so on. The method of adding the fatty acid during producing the anode mixture slurry, the method of adding the fatty acid during synthesizing the tin-containing alloy by the mechanical alloying method, or the method of adding the fatty acid during pulverizing an alloy which is melted and then solidified is more preferable. However, when the tin-containing alloy is synthesized by a melting method, the method of adding the fatty acid during synthesizing is not preferable, because the fatty acid is thermally decomposed.

The separator 23 includes, for example, a porous film made of a microporous polyolefin-based material such as a polyethylene film, a polypropylene film or the like, a porpous film made of an inorganic material such as nonwoven fabric made of a ceramic, and the separator 23 may include a laminate including two or more kinds selected from these porous films. In order to secure the safety of the battery, the material of the separator 23 preferably has a function of blocking pores at 80° C. or over to increase resistance, thereby interrupting a current, and a blocking temperature is preferably within a range from 90° C. to 180° C. inclusive.

In the separator 23, the electrolyte solution which is a liquid electrolyte is penetrated. The electrolyte solution is a solvent in which, for example, a lithium salt as an electrolyte salt is dissolved. As the solvent, a nonaqueous solvent is preferable, and more specifically an organic solvent such as propylene carbonate, ethylene carbonate, diethyl carbonate, methyl ethyl carbonate, dimethyl carbonate, 1,2-dimethoxyethane, 1,2-diethoxyethane, γ-butyrolactone, tetrahydrofuran, 2-methyl tetrahydrofuran, 1,3-dioxolane, 4-methyl-1,3-dioxolane, diethyl ether, sulfolane, methyl sulfolane, acetonitrile, propylnitrile, anisole, acetate, propionate or the like is preferable. As the solvent, one kind or a mixture of two or more kinds selected from the nonaqueous solvents is used.

As the lithium salt, for example, $LiClO_4$, $LiAsF_6$, $LiPF_6$, $LiBF_4$, $LiB(C_6H_5)_4$, $LiCH_3SO_3$, $LiCF_3SO_3$, LiCl, LiBr or the like is cited, and one kind or a mixture of two or more kinds selected from the lithium salts is used.

The secondary battery can be manufactured through the following steps, for example.

At first, the lithium-containing composite oxide and, if necessary, the electronic conductor and the binder are mixed to prepare a cathode mixture, then the cathode mixture is dispersed in a solvent such as N-methyl-2-pyrrolidone or the like to produce cathode mixture slurry in paste form. After the cathode mixture slurry is applied to the cathode current collector layer, and the solvent is dried, the cathode mixture layer is formed through compression molding by a roller press or the like to form the cathode 21.

Next, for example, the tin-containing alloy, the carbon material, the fatty acid or the metal salt thereof, and, if necessary, the binder are mixed to prepare the anode mixture, then the mixture is dispersed in a solvent such as N-methyl-2-pyrrolidone or the like to produce anode mixture slurry in paste form. After the anode mixture slurry is applied to the anode current collector layer, and the solvent is dried, the anode mixture layer is formed through compression molding by a roller press or the like so as to form the anode 22.

Then, the cathode lead 25 is derived from the cathode current collector layer, and the anode lead 26 is derived from the anode current collector layer. After that, for example, the cathode 21 and the anode 22 are mounted with the separator 23 in between through welding or the like, and the anode lead 26 is attached to the anode current collector layer through welding or the like. After that, for example, a laminate including the cathode 21 and anode 22 with the separator 23 in between is spirally wound, and an end portion of the cathode lead 25 is welded to the safety valve mechanism 15, and an end portion of the anode lead 26 is welded to the battery can 11. Then, the spirally wound laminate including the cathode 21 and the anode 22 is sandwiched between a pair of insulating plates 12 and 13, and is contained in the battery can 11. After the laminate including the cathode 21 and the anode 22 is contained in the battery can 11, the electrolyte (for example, the electrolyte solution) is injected into the battery can 11, and the separator 23 is impregnated with the electrolyte. After that, the battery cover 14, the safety valve mechanism 15 and the PTC device 16 are fixed in an opened end portion of the battery can 11 through caulking by the gasket 17. Thereby, the secondary battery shown in FIG. 1 is formed.

The secondary battery works as follows.

In the secondary battery, when charge is carried out, for example, lithium ions are extracted from the cathode 21, and are inserted into the anode 22 through the electrolyte with which the separator 23 is impregnated. When discharge is carried out, for example, the lithium ions are extracted from the anode 22, and are inserted into the cathode 21 through the electrolyte with which the separator 23 is impregnated. In this case, the anode 22 includes the tin-containing alloy powder, so a higher battery capacity can be obtained. Moreover, the anode mixture layer includes at least one kind selected from the group consisting of the fatty acids and metal salts thereof, so the degradation reaction during a charge-discharge cycle under high temperature conditions can be prevented, thereby a superior charge-discharge cycle characteristic under high temperature conditions can be obtained.

Thus, in the secondary battery according to the embodiment, the anode mixture layer including the tin-containing alloy powder includes at least one kind selected from the group consisting of the fatty acids and the metal salts thereof, so a superior battery capacity and a superior charge-discharge cycle characteristic under high temperature conditions can be obtained.

More specifically, when the content of the group consisting of the fatty acids and the metal salts thereof in the anode mixture layer is within a range from 0.1 wt % to 6 wt % inclusive, a superior battery capacity and a superior charge-discharge cycle characteristic under high temperature conditions can be obtained, and a load characteristic can be improved.

The secondary battery according to the embodiment can be used in, for example, headphone stereos, video camcorders, liquid crystal display televisions, portable CD players, minidisk players, notebook computers, cellular phones, electric razors, transceivers, electronic organizers, electronic calculators, radios, toys, game machines, clocks, pacemakers or the like. In addition, the secondary battery can be combined with a generator such as solar cell, fuel cell or the like.

Moreover, referring to FIG. 1, specific examples of the present invention will be described in detail below.

EXAMPLES 1 THROUGH 5

At first, $LiNi_{0.5}Co_{0.25}Mn_{0.25}O_2$ with an average secondary particle size of 15 μm was prepared as the cathode active material, and 91 parts by mass of the cathode active material, 6 parts by mass of graphite as an electronic conductor and 3 parts by mass of polyvinylidene fluoride as a binder were mixed so as to prepare the cathode mixture. After the cathode mixture was prepared, the mixture was dispersed in N-methyl-2-pyrrolidone which was the solvent to produce the cathode mixture slurry, and the cathode mixture slurry was uniformly applied to both sides of the cathode current collector layer made of strip-shaped aluminum foil with a thickness of 20 μm, and was dried. Then, the cathode mixture layer was formed through compression molding by the roller press to form the cathode 21.

Next, a tin powder, a cobalt powder, and a zinc powder were weighed so as to have a total mass of 15 g at an atomic ratio of 2:2.25:0.75, and then these powders were mechanically alloyed by use of a planetary ball mill in an atmosphere of argon for 60 hours to obtain a black powder. At that time, balls and the powders were blended at a mass ratio of 20:1, and then were sealed in a container. Next, the black powder was put through a sieve with opening of 250 μm to form the tin-containing alloy powder. When the obtained tin-containing powder was observed by a secondary electron microscope, primary particles with a size of approximately 1 μm were secondarily aggregated. Further, the average size of secondary particles determined by laser diffraction was 35 μm.

Next, 45 parts by mass of the tin-containing alloy powder, 45 parts by mass of artificial graphite with an average particle size of 10 μm, 10 parts by mass of polyvinylidene fluoride as a binder, and stearic acid as a fatty acid (with a carbon number of 18) were put into an automatic mortar to prepare the anode mixture through dry mixing. At that time, the content of the stearic acid in the anode mixture was changed as shown in Examples 1 through 5 in Table 1. After the anode mixture was prepared, the anode mixture was dispersed in N-methyl-2-pyrrolidone which was the solvent to produce the anode mixture slurry, and the anode mixture slurry was uniformly applied to both sides of the anode current collector layer made of strip-shaped copper foil with a thickness of 15 μm, and was dried. Then, the anode mixture layer was formed through compression molding by the roller press to form the anode 22.

After the cathode 21 and the anode 22 were formed, the cathode lead 25 was derived from a cathode current collector, and the anode lead 26 was derived from an anode current collector, and an insulating tape was stuck on each lead.

Next, the separator 23 made of a microporous polyethylene film with a thickness of 25 μm was prepared, and a laminate including the anode 22, the separator 23, the cathode 21 and the separator 23 in order was spirally wound many times, and an outermost portion thereof was fixed with a tape to form the spirally wound electrode body 20.

After the spirally wound electrode body 20 was formed, the spirally wound electrode body 20 was sandwiched between a pair of insulating plates 12 and 13, and the anode lead 26 was welded to a bottom portion of the battery can 11 made of iron, and the cathode lead 25 was welded to a projected portion of the safety valve mechanism 15. Then, the spirally wound electrode body 20 was contained in the nickel-plated battery can 11. After that, the electrolyte solution was injected into the battery can 11. As the electrolyte solution, a mixed solvent containing 50 vol % of ethylene carbonate and 50 vol % of ethyl methyl carbonate in which $LiPF_6$ as the electrolyte salt was dissolved at a ratio of 1 mol/dm$^3$ was used. Finally, the battery cover 14 was caulked into the battery can 11 by the gasket 17 so as to fix the safety valve mechanism 15, the PTC device 16 and the battery cover 14. Thereby, the cylindrical secondary batteries shown in FIG. 1 with an outside diameter of 18 mm and a height of 65 mm according to Examples 1 through 5 were formed.

A charge-discharge cycle test under high temperature conditions and a load characteristic test were carried out on the obtained secondary batteries. The results are shown in Table 1.

The charge-discharge cycle test under high temperature conditions was carried out as follows. At first, after the charge was carried out at ambient temperature and a constant current of 1 A until the battery voltage reached 4.2 V, charge was carried out at a constant voltage of 4.2 V until the total charge time reached 15 hours. After that, discharge was carried out at a constant current of 1 A until the battery voltage reached 2.5 V. After the first cycle of charge and discharge was carried out, charge and discharge were carried out in the same conditions as those in the first cycle except that the cycle was carried out at 60°, and the total charge time was 5 hours, and a charge capacity in the second cycle was determined. Charge and discharge were repeated in the same conditions as those in the second cycle thereafter, and a discharge capacity in the hundredth cycle was determined, then a ratio of the discharge capacity in the hundredth cycle to that in the second cycle (cycle capacity retention ratio) was determined. A formula for determining the ratio was the cycle capacity retention ratio=(the discharge capacity in the hundredth cycle/the discharge capacity in the second cycle) %100.

Further, the load characteristic test was carried out as follows. At first, after one cycle of charge and discharge was carried out at the same conditions as those in the first cycle in the charge-discharge cycle test, charge and discharge were carried out in the same conditions as those in the second cycle in the charge-discharge cycle test, and a discharge capacity in the second cycle was determined. Next, after charge was carried out in the same conditions as those in the second cycle, discharge was carried out at a constant current of 4 A until the battery voltage reached 2.5 V, and a discharge capacity in the third cycle (a discharge capacity during high load discharge, that is, during large current discharge) was determined. Then, a ratio of the discharge capacity in the third cycle to the discharge capacity in the second cycle was determined. A formula for determining the ratio was the capacity ratio during high load discharge=(the discharge capacity in the third cycle/the discharge capacity in the second cycle)% 100.

As Comparative Example 1 relative to Examples 1 through 5, a secondary battery was formed as in the case of Example 1, except that the anode mixture layer did not include the stearic acid. The charge-discharge cycle test under high temperature conditions and the load characteristic test were carried out on Comparative Example 1 in the same manner as Example 1. The obtained results were shown in Table 1.

It was obvious from Table 1 that in the secondary batteries of Examples, a higher value in the cycle capacity retention ratio at 60° C. than that in the secondary battery of Comparative Example 1 could be obtained. In other words, it was found out that when the anode mixture layer included the stearic acid, the charge-discharge cycle characteristic under high temperature conditions could be improved.

Moreover, in the results of Examples 1 through 5, there was a tendency that when the content of the stearic acid became larger, the cycle capacity retention ratio at 60° C. and the capacity ratio during high load discharge became higher, and after the ratios reached the maximum values, the values declined. Further, there was a tendency that when the content of the stearic acid became larger, the capacity declined. In other words, it was found out that when the content of the stearic acid in the anode mixture layer was within a range of 0.1 wt % to 6 wt % inclusive, higher values of the capacity, the cycle capacity retention ratio and the capacity ratio during high load discharge could be obtained.

EXAMPLE 6

A secondary battery of Example 6 was formed as in the case of Example 3 except that the stearic acid was added during a mechanical alloying process of the tin-containing alloy (after a lapse of 55 hours), not during preparing the anode mixture. After the stearic acid was added, the mechanical alloying process was carried out for another 5 hours, thereby the tin-containing alloy powder was obtained. The charge-discharge cycle test under high temperature conditions and the load characteristic test were carried out on Example 6 in the same manner as Example 3 to determine the capacity, the cycle capacity retention ratio at 60° C. and the capacity ratio during high load discharge. The obtained results were shown in Table 2 together with the results of Comparative Example 1.

It was obvious from Table 2 that the secondary battery of Example 6 could obtain as high values of the capacity, the cycle capacity retention ratio at 60° C. and the capacity ratio during high load discharge as those in Example 3. In other words, it was found out that irrespective of the method of adding the stearic acid, when the stearic acid was included in the anode mixture layer, the charge-discharge cycle characteristic under high temperature conditions could be improved.

EXAMPLES 7 THROUGH 14

Secondary batteries of Examples 7 through 11 were formed as in the case of Example 3, except that different kinds of the fatty acid and the cathode active material were used as shown in Table 2. In Example 11, the mass ratio of $LiNi_{0.8}Co_{1.19}Al_{0.01}O_2$ to $LiFePO_4$ was 9:1. The secondary batteries of Examples 12 through 14 were formed as in the case of Example 3, except that the metal salt of the fatty acid shown in Table 2 was used instead of the fatty acid, and the anode mixture was prepared so that the content of the metal salt in the anode mixture was 2 wt %.

Moreover, as Comparative Example 2 relative to Example 10, a secondary battery was formed as in the case of Example 10, except that the anode mixture layer did not include palmitic acid. Further, as Comparative Example 3 relative to Example 11, a secondary battery was formed as in the case of Example 11, except that the anode mixture layer did not include behenic acid.

The charge-discharge cycle test under high temperature conditions and the load characteristic test were carried out on Examples 7 through 14 and Comparative Examples 2 and 3 in the same manner as Example 3 to determine the capacity, the cycle capacity retention ratio at 60° C. and the capacity ratio during high load discharge. The obtained results were shown in Table 3 together with the results of Example 3. Comparative Example 1 is a comparative example relative to Examples 3, 7, 8, 9, 10, 12 and 13.

It was obvious from Table 3 that the secondary batteries of Examples could obtain higher values of the cycle capacity retention ratio at 60° C. and the capacity ratio during high load discharge than those in Comparative Examples 1 through 3. In other words, it was found out that irrespective of which kind of the cathode active material was used, when the fatty acid or the metal salt thereof was included in the anode mixture layer, the charge-discharge cycle characteristic under high temperature conditions could be improved.

In the above Examples, the fatty acid and the metal salt thereof are described referring to specific examples, and it is considered that the above effects result from the molecular structures of the fatty acid and the metal salt thereof. Therefore, even if any other fatty acid and the metal salt thereof are used, the same effects can be obtained.

The present invention is described referring to the embodiment and examples, but the invention is not limited to the above embodiment and examples, and is variously modified. For example, the invention is widely applicable to any battery comprising the anode including the tin-containing alloy powder, and other structures of the battery may be different from the above embodiment and examples. More specifically, instead of the electrolyte solution, any other electrolyte such as a gel electrolyte in which a high molecular weight compound holds an electrolyte solution containing a lithium salt, a solid electrolyte in which a lithium salt is dispersed in a high molecular weight compound with ionic conductivity, a solid inorganic conductor or the like may be used.

For the gel electrolyte, various high molecular weight compounds which absorb the electrolyte solution to be gelled can be used. As such a high molecular weight compound, for example, a fluorine-based high molecular weight compound such as polyvinylidene fluoride, or a copolymer of vinylidene fluoride and hexafluoropropylene, an ether-based high molecular weight compound such as polyethylene oxide, a cross-link including polyethylene oxide or the like, or polyacrylonitrile is cited. Among them, the flurorine-based high molecular weight compound is preferable, because it has high stability of oxidation-reduction.

For the solid electrolyte, as the high molecular weight compound, for example, an ether-based high molecular weight compound such as polyethylene oxide, a cross-link including polyethylene oxide or the like, a ester-based high molecular weight compound such as polymethacrylate or the like, an acrylate-based high molecular weight compound, a mixture thereof, or any of the above high molecular weight compounds copolymerized in molecules can be used. Further, as the inorganic conductor, a polycrystal of lithium nitride, lithium iodide or lithium hydroxide, a mixture of lithium iodide and chromium trioxide, a mixture of lithium iodide, lithium sulfide and phosphorus subsulfide can be used.

Moreover, instead of the cylindrical secondary battery with a spirally-wound structure, the invention may be applied to a secondary battery with any other shape such as a prismatic shape, a coin shape, a button shape, a film shape in which an electrode device is sealed in a laminate film or the like. Further, the invention may be applied to a secondary battery with any other structure such as a structure comprising a laminate including the cathode and the anode with the separator in between. In addition, the invention may be applied to not only the secondary battery but also a primary battery.

As described above, in the battery according to the invention, at least one kind selected from the group consisting of fatty acids and metal salts thereof is included in the anode mixture layer including the tin-containing alloy powder, so a superior battery capacity and a superior charge-discharge cycle characteristic under high temperature condition can be obtained.

Moreover, in the battery according to an aspect of the invention, the content of the group consisting of the fatty acids and the metal salts thereof is within a range of 0.1 wt % to 6 wt % inclusive, so a superior battery capacity and a superior charge-discharge cycle characteristic under high temperature conditions can be obtained, and the load characteristic can be improved.

TABLE 1

| | FATTY ACID | | CATHODE ACTIVE MATERIAL | CAPACITY (mAh) | CYCLE CAPACITY RETENTION RATIO AT 60° C. (%) | CAPACITY RATIO DURING HIGH LOAD DISCHARGE (%) |
|---|---|---|---|---|---|---|
| | KIND | CONTENT (WT %) | | | | |
| EXAMPLE 1 | STEARIC ACID (C = 18) | 0.15 | $LiNi_{0.5}Co_{0.25}Mn_{0.25}O_2$ | 2070 | 61 | 75 |
| EXAMPLE 2 | STEARIC ACID (C = 18) | 0.5 | $LiNi_{0.5}Co_{0.25}Mn_{0.25}O_2$ | 2050 | 70 | 76 |
| EXAMPLE 3 | STEARIC ACID (C = 18) | 1 | $LiNi_{0.5}Co_{0.25}Mn_{0.25}O_2$ | 2040 | 71 | 76 |
| EXAMPLE 4 | STEARIC ACID (C = 18) | 3 | $LiNi_{0.5}Co_{0.25}Mn_{0.25}O_2$ | 2020 | 75 | 74 |
| EXAMPLE 5 | STEARIC ACID (C = 18) | 6 | $LiNi_{0.5}Co_{0.25}Mn_{0.25}O_2$ | 2020 | 70 | 70 |
| COMPARATIVE EXAMPLE 1 | — | 0 | $LiNi_{0.5}Co_{0.25}Mn_{0.25}O_2$ | 2070 | 54 | 72 |

TABLE 2

| | FATTY ACID | | CATHODE ACTIVE MATERIAL | CAPACITY (mAh) | CYCLE CAPACITY RETENTION RATIO AT 60° C. (%) | CAPACITY RATIO DURING HIGH LOAD DISCHARGE (%) |
|---|---|---|---|---|---|---|
| | KIND | CONTENT (WT %) | | | | |
| EXAMPLE 3 | STEARIC ACID (C = 18) | 1 | $LiNi_{0.5}Co_{0.25}Mn_{0.25}O_2$ | 2040 | 71 | 76 |
| EXAMPLE 6 | STEARIC ACID (C = 18) | 1 | $LiNi_{0.5}Co_{0.25}Mn_{0.25}O_2$ | 2040 | 73 | 75 |
| COMPARATIVE EXAMPLE 1 | — | 0 | $LiNi_{0.5}Co_{0.25}Mn_{0.25}O_2$ | 2070 | 54 | 72 |

TABLE 3

| | FATTY ACID OR METAL SALT OF FATTY ACID | | CATHODE ACTIVE MATERIAL | CAPACITY (mAh) | CYCLE CAPACITY RETENTION RATIO AT 60° C. (%) | CAPACITY RATIO DURING HIGH LOAD DISCHARGE (%) |
|---|---|---|---|---|---|---|
| | KIND | CONTENT (WT %) | | | | |
| EXAMPLE 3 | STEARIC ACID (C = 18) | 1 | $LiNi_{0.5}Co_{0.25}Mn_{0.25}O_2$ | 2040 | 71 | 76 |
| EXAMPLE 7 | LAURIC ACID (C = 12) | 1 | $LiNi_{0.5}Co_{0.25}Mn_{0.25}O_2$ | 2100 | 72 | 76 |
| EXAMPLE 8 | LINOLEIC ACID (C = 18) | 1 | $LiNi_{0.5}Co_{0.25}Mn_{0.25}O_2$ | 2030 | 74 | 72 |
| EXAMPLE 9 | LINOLENIC ACID (C = 18) | 1 | $LiNi_{0.5}Co_{0.25}Mn_{0.25}O_2$ | 2020 | 73 | 72 |
| EXAMPLE 10 | PALMITIC ACID (C = 16) | 1 | $LiCoO_2$ | 2000 | 71 | 76 |
| EXAMPLE 11 | BEHENIC ACID (C = 22) | 1 | $LiNi_{0.8}Co_{0.19}Al_{0.01}O_2$ + $LiFePO_4$ | 2100 | 75 | 72 |

TABLE 3-continued

| | FATTY ACID OR METAL SALT OF FATTY ACID | | | | CYCLE CAPACITY RETENTION | CAPACITY RATIO DURING |
|---|---|---|---|---|---|---|
| | KIND | CONTENT (WT %) | CATHODE ACTIVE MATERIAL | CAPACITY (mAh) | RATIO AT 60° C. (%) | HIGH LOAD DISCHARGE (%) |
| EXAMPLE 12 | LITHIUM STEARATE | 2 | $LiNi_{0.5}Co_{0.25}Mn_{0.25}O_2$ | 2060 | 69 | 76 |
| EXAMPLE 13 | SODIUM STEARATE | 2 | $LiNi_{0.5}Co_{0.25}Mn_{0.25}O_2$ | 2060 | 70 | 76 |
| EXAMPLE 14 | POTASSIUM STEARATE | 2 | $LiNi_{0.5}Co_{0.25}Mn_{0.25}O_2$ | 2060 | 70 | 76 |
| COMPARATIVE EXAMPLE 1 | — | 0 | $LiNi_{0.5}Co_{0.25}Mn_{0.25}O_2$ | 2070 | 54 | 72 |
| COMPARATIVE EXAMPLE 2 | — | 0 | $LiCoO_2$ | 2010 | 60 | 70 |
| COMPARATIVE EXAMPLE 3 | — | 0 | $LiNi_{0.8}Co_{0.19}Al_{0.01}O_2$ + $LiFePO_4$ | 2120 | 58 | 71 |

The invention claimed is:

1. A battery, comprising: a cathode; an anode; a nonaqueous solvent and an electrolyte, wherein the anode includes an anode mixture layer, the anode mixture layer comprising a tin-containing alloy powder and at least one compound selected from the group consisting of fatty acids and fatty acid metal salts.

2. A battery according to claim 1, wherein the fatty acids are saturated fatty acids or unsaturated fatty acids with with at least 10 to and at most 25 carbon atoms, and the metal salts are alkali metal salts or alkaline earth metal salts of saturated fatty acids or unsaturated fatty acids with at least 10 to at most 25 carbon atoms.

3. A battery according to claim 1, wherein the ratio (A+B)/T is at least 0.00 1 and at most 0.06, A being the weight of the fatty acids contained in the anode mixture layer, B being the weight of the fatty acid metal salts contained in the anode mixture layer and T being the total weight of the anode mixture layer.

4. A battery according to claim 1, wherein the anode mixture layer further includes a carbon material.

5. A battery according to claim 1, wherein the cathode includes a lithium-containing complex oxide including at least one element selected from the group consisting of cobalt, nickel, manganese and iron.

* * * * *